(12) United States Patent
Kelly et al.

(10) Patent No.: US 8,911,099 B2
(45) Date of Patent: Dec. 16, 2014

(54) METHOD OF DEVELOPING AND MANUFACTURING OPTICAL ELEMENTS AND ASSEMBLIES

(75) Inventors: Timothy Kelly, Brookline, MA (US); Terence Yeo, Boston, MA (US)

(73) Assignee: Fusion Optix, Inc., Woburn, MA (US)

(*) Notice: Subject to any disclaimer, the term of this patent is extended or adjusted under 35 U.S.C. 154(b) by 389 days.

(21) Appl. No.: 13/172,896

(22) Filed: Jun. 30, 2011

(65) Prior Publication Data

US 2012/0250172 A1 Oct. 4, 2012

Related U.S. Application Data

(60) Provisional application No. 61/470,126, filed on Mar. 31, 2011, provisional application No. 61/481,277, filed on May 2, 2011.

(51) Int. Cl.
*G02B 5/08* (2006.01)
*G02B 7/182* (2006.01)
*B29D 11/00* (2006.01)
*F21V 5/00* (2006.01)
*G02B 19/00* (2006.01)

(52) U.S. Cl.
CPC ...... *G02B 19/0061* (2013.01); *B29D 11/00596* (2013.01); *F21V 5/007* (2013.01)
USPC .......................................... 359/850

(58) Field of Classification Search
USPC ......................... 359/354–359, 726–732, 850; 101/450.1–473; 430/302–305; 378/34–35; 355/53
See application file for complete search history.

(56) References Cited

U.S. PATENT DOCUMENTS

| 737,979 | A | 6/1898 | Wadsworth | |
| 4,989,952 | A | 2/1991 | Edmonds | |
| 2001/0042637 | A1* | 11/2001 | Hirose et al. | 174/255 |
| 2004/0201977 | A1* | 10/2004 | Edmonds | 362/31 |

* cited by examiner

*Primary Examiner* — William Choi
*Assistant Examiner* — Sharrief Broome

(57) ABSTRACT

Alternative methods of designing, developing and manufacturing optical elements and assemblies are provided which enable improvements in effectiveness and efficiency. Subtractive processes using lasers or other tools are utilized to create embedded void spaces that provide reflecting walls within internally reflective optical elements. The designs have advantages in cost, reduced development time, and performance. Light from multiple light sources can be mixed and collimated. Some embodiments provide the ability to integrate a large number of internally reflective optics into a single component and very large components can be made. Embodiments of the invention are designed for manufacturing and can be made without molding tooling.

18 Claims, 14 Drawing Sheets

METHOD OF DEVELOPING AND MANUFACTURING OPTICAL ELEMENTS AND ASSEMBLIES

CROSS REFERENCE TO RELATED APPLICATIONS

This application claims the benefit of U.S. Provisional Applications No. 61/481,277 filed on May 2, 2011 entitled "Collimating Optical Element and Light Emitting Assembly," and U.S. Provisional 61/470,126 filed on Mar. 31, 2011 entitled "Method of Manufacturing Optical Elements" both incorporated herein in entirety.

BACKGROUND

The market for the mass production of lenses for new highly efficient and cost effective optic solutions, such as those involving light emitting diodes (LEDs), is expected to grow significantly in the near future as they replace older, less efficient lighting systems. In order to meet the rising demand, suppliers are looking to develop new ways of manufacturing lenses on a larger scale.

TIR (total internal reflection) collimating lenses are commonly used for applications such as LED lighting and are typically produced using injection molding processes. Injection molding, the most common precision method for mass production of optical elements, provides means to produce lenses in high volume but is subject to high costs and long lead times associated with the making of required tooling. Additionally, injection molding equipment requires significant capital investment and requires significant energy to operate. Some disadvantages of this process are expensive equipment investment, potentially high operating costs, and the need to design parts in such a manner that they can be non-destructively separated from tooling after molding. Tooling restrictions of molded parts limit the designs possible with molded parts.

There is need for alternative design and manufacturing methods which can shorten development time of new optical components, provide lower fixed and operating costs, and provide capabilities to for new types of designs.

SUMMARY

Alternative methods of designing, developing and manufacturing optical elements and assemblies are provided which enable improvements in effectiveness and efficiency. Subtractive processes using lasers or other tools are utilized to create embedded void spaces that provide reflecting walls within internally reflective optical elements. The designs have advantages in cost, reduced development time, and performance. Light from multiple light sources can be mixed and collimated. Some embodiments provide the ability to integrate a large number of internally reflective optics into a single component and very large components can be made. Embodiments of the invention are designed for manufacturing and can be made without molding tooling.

DETAILED DESCRIPTION

Figure 1:
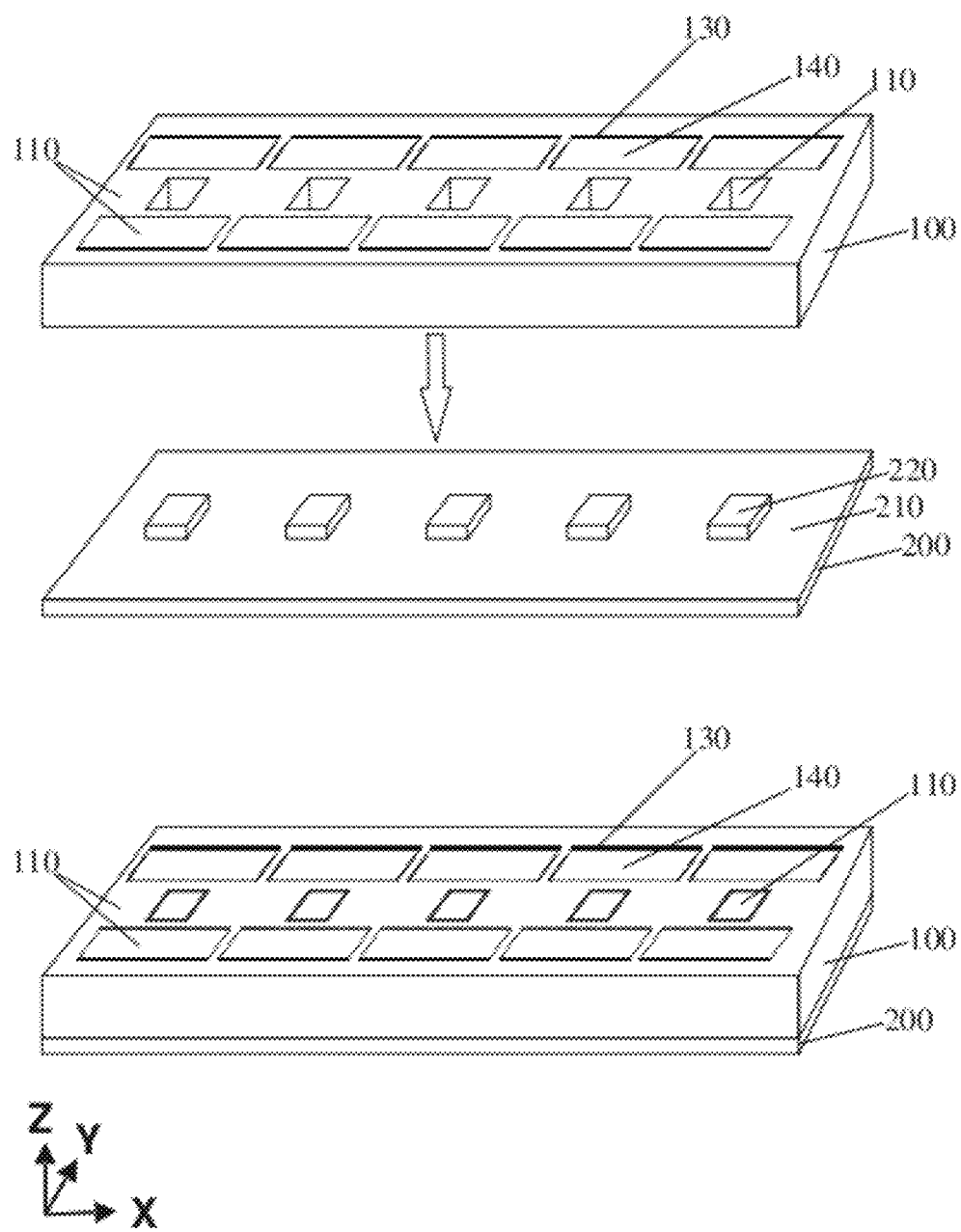
FIG. 1 is a perspective view of a linear embodiment of an optical collimating assembly containing an optical collimating element fabricated with a laser cutting process.

In order to promote an understanding of described manufacturing methods, reference will now be made to the exemplary embodiments illustrated in the drawings, and descriptive language will be used to detail the same. It will nevertheless be understood that no limitation of the scope of the invention is thereby intended. Any alterations and further modifications of the inventive features manifested herein, and any additional applications of the principles of the invention as depicted herein that would occur to one skilled in the art are to be considered within the scope of the invention.

Embodiments of the invention will now be described with reference to the accompanying figures.

Figure 2:
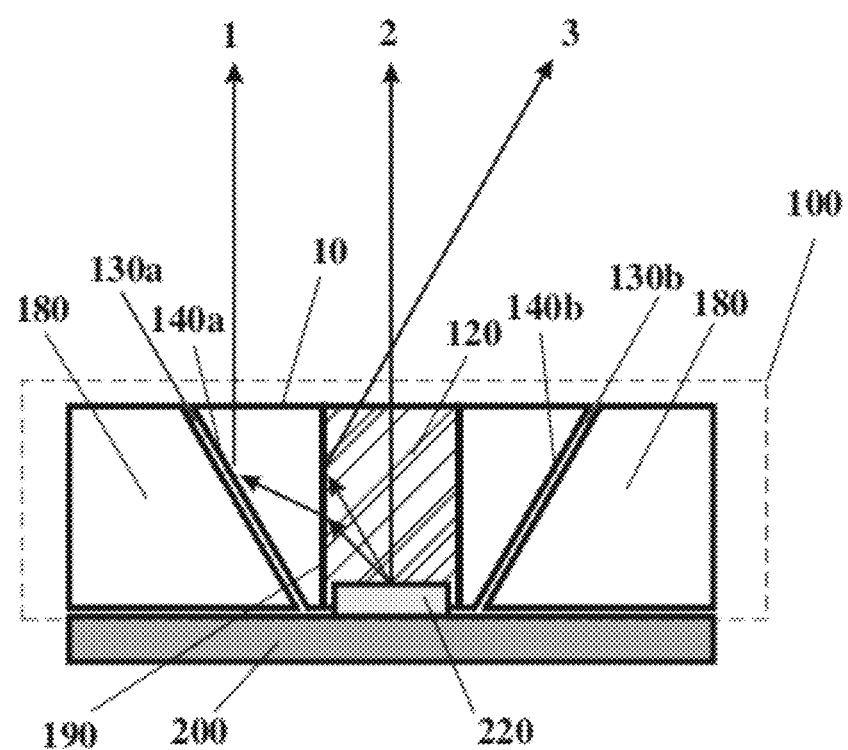
FIG. 2 is a cross-section view of a linear embodiment of an optical collimating assembly containing an optical collimating element fabricated with a subtractive laser cutting process. Fasteners are shown mounted through the optically isolated region.
Figure 5:
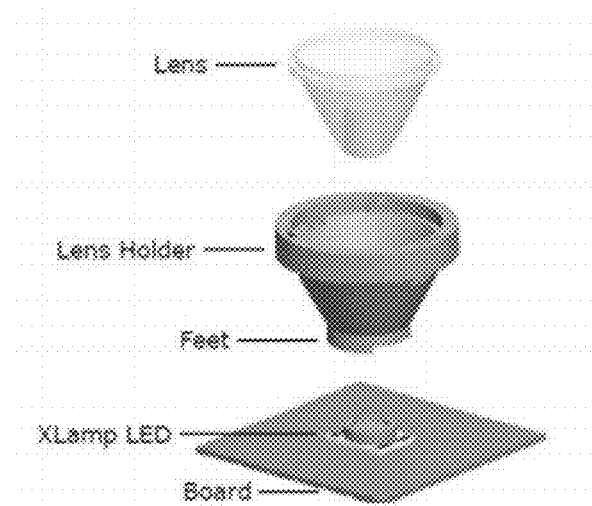
FIG. 5 is a prior art illustration of a typical LED optic assembly
Figure 6:
FIG. 6 is a prior art picture of commercial LED fixture with typical LED optic assembly

FIG. 1 is a perspective drawing of a linear embodiment of a collimating optical assembly. The optical assembly includes a linear collimating optical element 100, a light source board 200, and optionally refractive lenses 160. The light source board 200, its surface 210, and its associated lighting sources 220 are aligned such that the collimating optical element 100 may be inserted onto the light source board. As shown, both the spacing for lighting source on the collimating optical element opening 110 and the spacing between the light sources 220 on the lighting strip are in a linear equally spaced apart relationship. In an alternative embodiment, the spacing between each lighting source 220 is not equidistant. The collimating optical element 100 rests on top of the light source board 200 and may be fixated by any reasonable means, such as on the outer edges of the collimating optical element 100 and light source board 200. Alternatively, the collimating optical element 100 may be molded or otherwise bonded to the light source board 200. In some embodiments, the collimating optical element can be configured to lay flat upon the light source board 200 in a stable manner without additional mounting structures as commonly used with conventional secondary optical lenses. The conventional design of a molded TIR optical lens, such as the reference lens shown in FIG. 5, typically produces a lens which easily tips over or becomes detached from its intended light source due to a small contact area with the LED board and a top-heavy design resulting from increasing width vs. distance from the LED board. Traditionally, a lens holder is used to mechanically stabilize and fasten individual LED lenses. FIG. 5 shows a conventional optical assembly of individual collimating lenses. In contrast, in the present embodiment of the invention, an integrated optic can be mechanically stabilized and aligned with respect to the light sources by fastening to or through an optically isolated region 180 of the optical element as shown in FIG. 2. This allows the entire integrated optic to be stabilized and fastened in a light fixture with one process while avoiding interference with the primary optical output path of the assembly. Typically, at least one void space and reflective wall are positioned between a light source and an optically isolated region. An optically isolated region is one which at least one void space and reflective wall is placed between a light source and the region.

Figure 7:
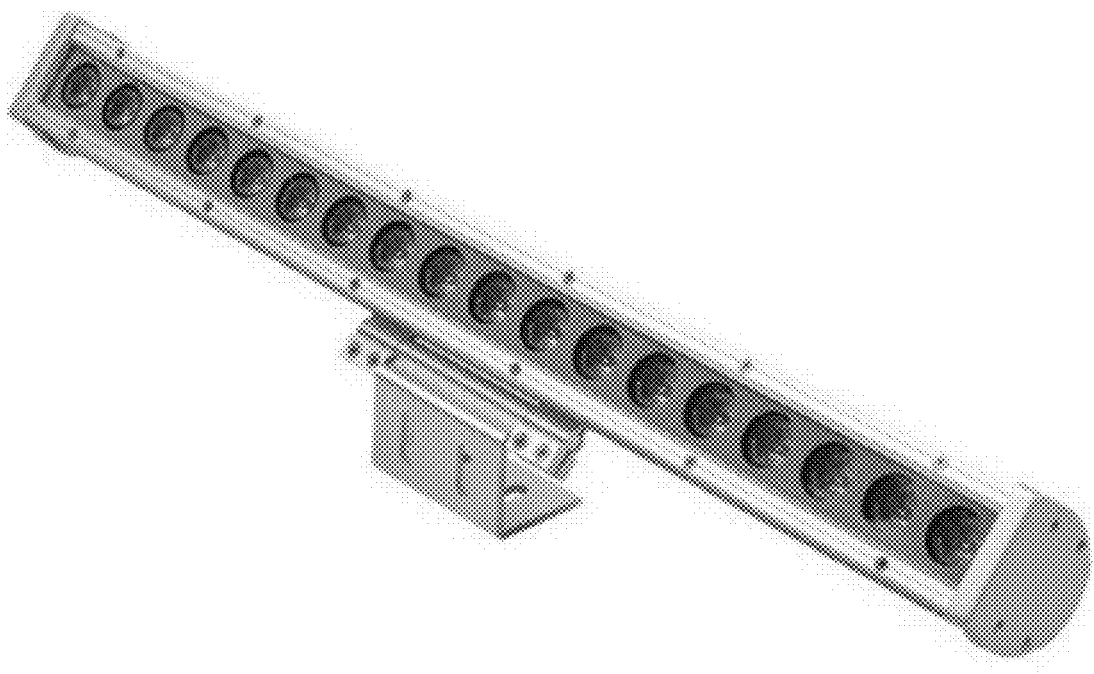
FIG. 7 is a prior art picture of a commercial liner LED fixture with typical LED optic assembly.
Figure 8:
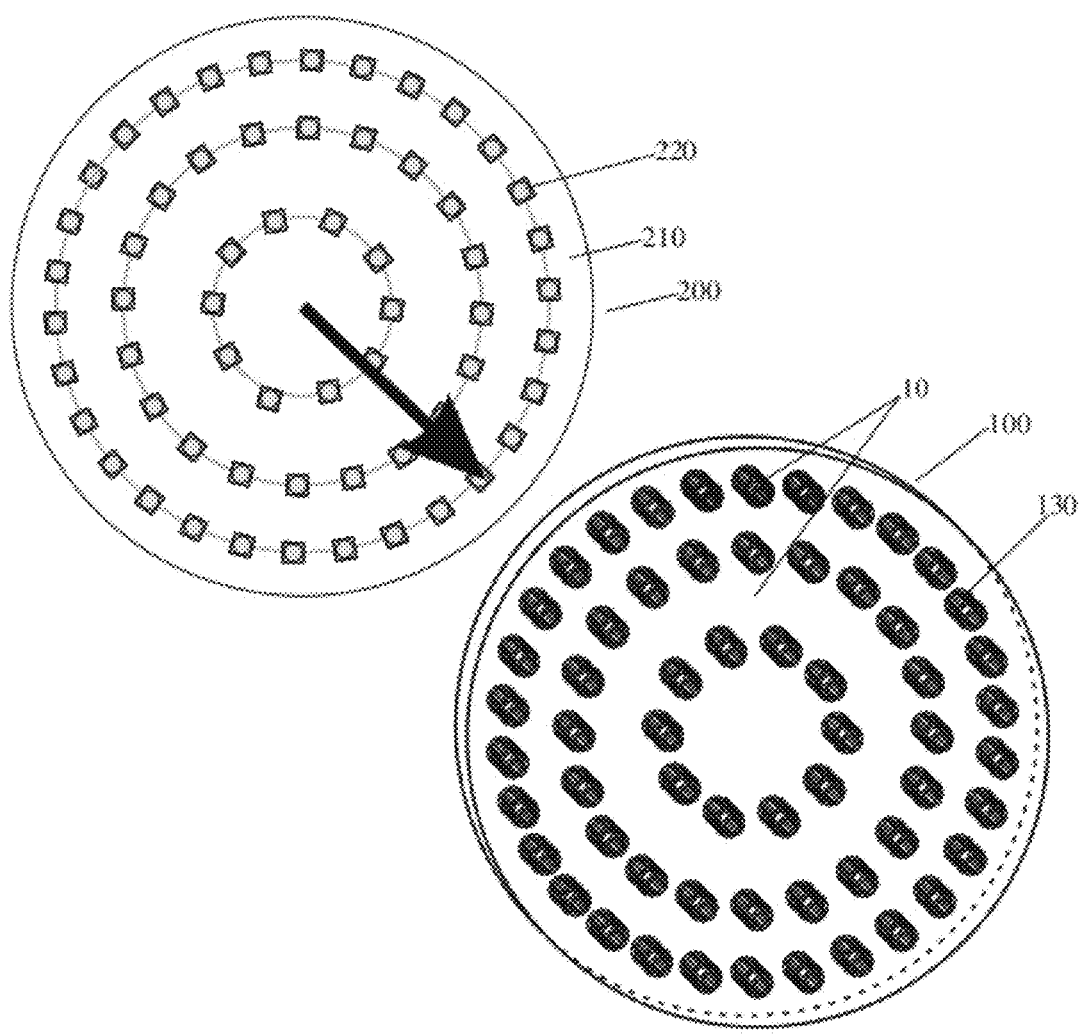
FIG. 8 shows embodiment FL1, which includes a circular array of tubular reflecting walls.
Figure 9:
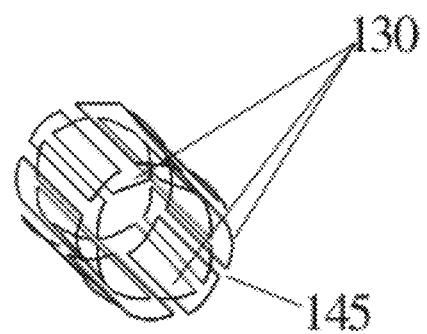
FIG. 9 shows a tubular reflecting wall region of embodiment FL1.
Figure 10:
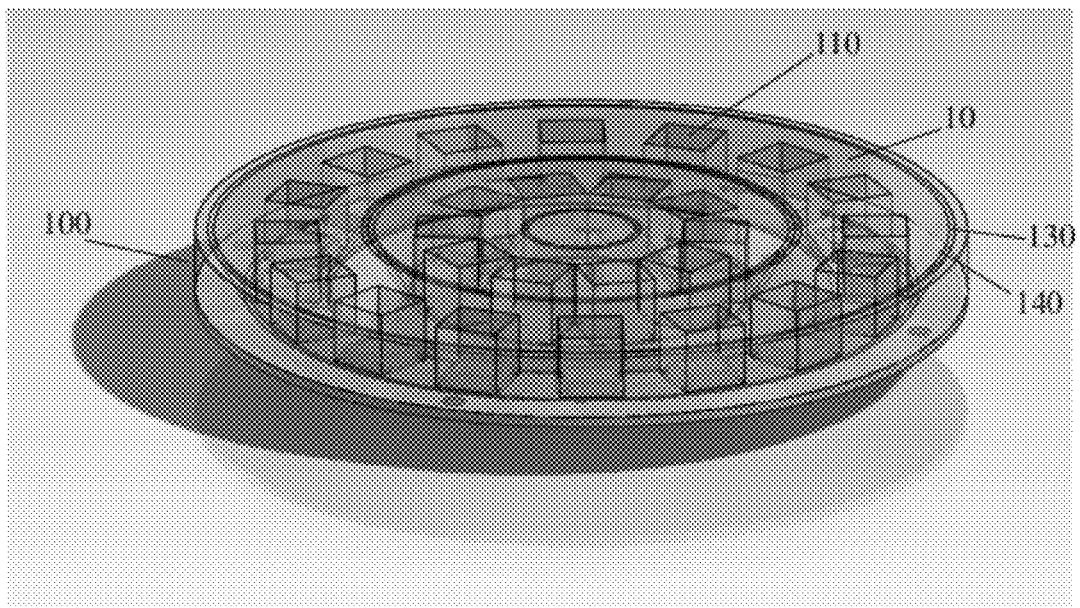
FIG. 10 is a circular embodiment perspective view.
Figure 11:
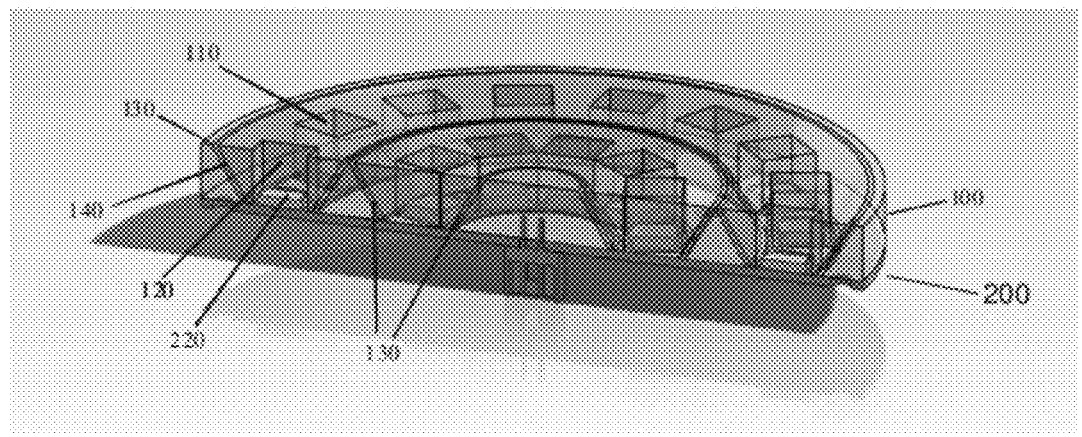
FIG. 11 is a circular embodiment perspective cross-section view.
Figure 12:
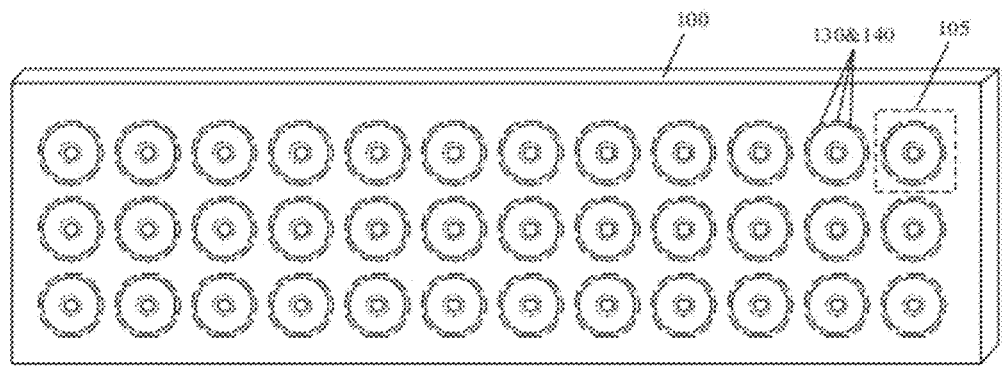
FIG. 12 is a view of embodiment FL2, an integrated optical element configured for wall washing LED fixture.

FIG. 1 illustrates a linear embodiment of the invention that can be used in similar applications to conventional linear LED light fixtures, such as the one shown in FIG. 7. Many configurations are possible for producing voids within the optical element that create reflective walls. Embodiments can be fabricated with the use of a CO2 laser, which produces narrow voids with a range in width of 0.1-2 mm, more ideally 0.5-1.5 mm and most preferably less than approximately 1 mm wide that can be fabricated in precise patterns. For example, circular cuts with a CO2 laser can be used to create void spaces 130 that produce tubular reflecting walls 140 encircling individual light sources as shown in FIG. 8 and FIG. 9. Alternatively, concentric voids creating angled concentric reflecting walls 140 can be fabricated in lenses to form collimating concentric rings as shown in FIG. 10 and FIG. 11. Either of these alternatives could be utilized in a LED fixture application such as a downlight.

Shown in FIG. 1 is a linear collimating optical assembly embodiment that is particularly adapted for directly lighting or illuminating a space or target illumination zone. The collimating optical element 100 is mounted to a base member, for example a LED light strip with an array of LEDs, so that light emitted from the lights on the light strip is directed through the shaped opening 110 on the collimating optical element when the lights are lit. The collimating optical element 100 is constructed from a rigid translucent material such as acrylic or polycarbonate. The light strip may be comprised of an opaque material with a white surface to facilitate scattering of incident light toward the output surface. If it is desired to have some light infiltration through the back side of the strip, a translucent or transparent material may be optionally employed. The optical collimating element 100 comprises a series of linear collimating optic features integrated into the collimating optical element 100. Un-collimated light diverging from the lighting source enters the optical collimating lens through the shaped opening 110 and is focused into rays of light significantly more normal to the output surface 10.

The shaped opening may be of any practical size or shape, as illustrated in FIG. 1, to account for the varying light source packages that may be used with a collimating optical element, as will be readily apparent to those skilled in the art. Light distribution from the optical assembly is influenced by the angle of the reflecting walls 140 of the linear collimating optical element 100. The reflecting walls 140 utilize a void 130 embedded within the lens that may remain an air space in final use or alternatively be filled with a substance of refractive index differing from that of the lens substrate. Prototype embodiments have been fabricated with the use of either 40-watt or 60-watt CO2 lasers, which effectively removed a channel of material from a sheet of commercially available Acrylite FF extruded acrylic sheet manufactured by Evonik Industries. The staggered pattern of angle cuts into the sheet produced sufficient air interface structures for collimation while maintaining the physical integrity of a single optic component.

Optionally, it is possible to fabricate additional holes or miscellaneous cutouts in the collimating optical element without interfering with the optical path. These can be used to facilitate the use of fasteners to hold the collimating optical element and circuit board to each other or other components such as mounting frames, housings, heat sinks, etc. Optionally, reflectors can be cut continuously through the collimating optical element substrate to produce a smaller optic with an angled edge.

FIG. 1 illustrates a collimating optical assembly embodiment with reflecting walls 140 that are internally reflecting. The reflective walls 140 function as TIR optics within a critical angle of total internal reflection determined by Snell's law as $$\theta_{crit} = \arcsin\left(\frac{n_2}{n_1}\sin\theta_2\right) = \arcsin\frac{n_2}{n_1}$$

where $\theta_2=90°$. $n_2$ equals the refractive index of the light transmissive matrix, 1.49 in the case of acrylic. $n_1$ equals the refractive index of the void material, 1 in the case of air.

FIG. 1 and FIG. 2 show views of a linear embodiment of an optical collimating assembly containing an optical collimating element fabricated with a subtractive laser cutting process. Fasteners 181 are shown mounted through the optically isolated region 180. A light source 220 is mounted to a light source board 200 and disposed within a shaped opening 110. The surface of the shaped opening serves as a refracting wall 120 in the optical design. Void spaces 130a and 130b create reflecting walls 140a and 140b respectively. Example light rays emitted from the light source are traced as output path 1, output path 2, and output path 3. Output path 1 is refracted by the refracting wall, reflected by the reflecting wall, and subsequently emitted from the output surface 10. Output path 2 is emitted from the light source and passes directly through the shaped opening. Output path 3 reflects off of the refracting wall before exiting the shaped opening. A prototype of the embodiment of FIG. 1 was fabricated and measured to have a collimated beam output with a full width half maximum (FWHM) of 71 degrees in the y axis and 79 degrees in the x axis. This compares with a FWHM of 140 in the y axis and a FWHM angle of 130 degrees in the x axis with no collimating optical element. Peak brightness was increased with the collimating optical element by 43%.

Figure 3:
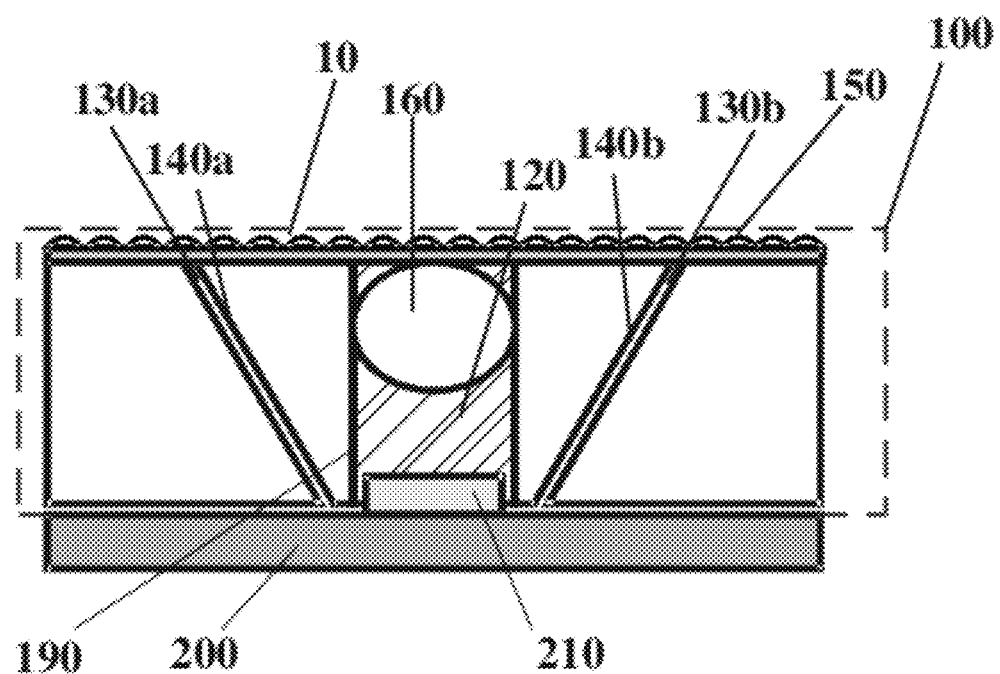
FIG. 3 is a cross-section view of a linear embodiment of an optical collimating assembly containing an optical collimating element fabricated with a subtractive laser cutting process. Included is a light redirecting layer with half sphere shaped features.
Figure 4:
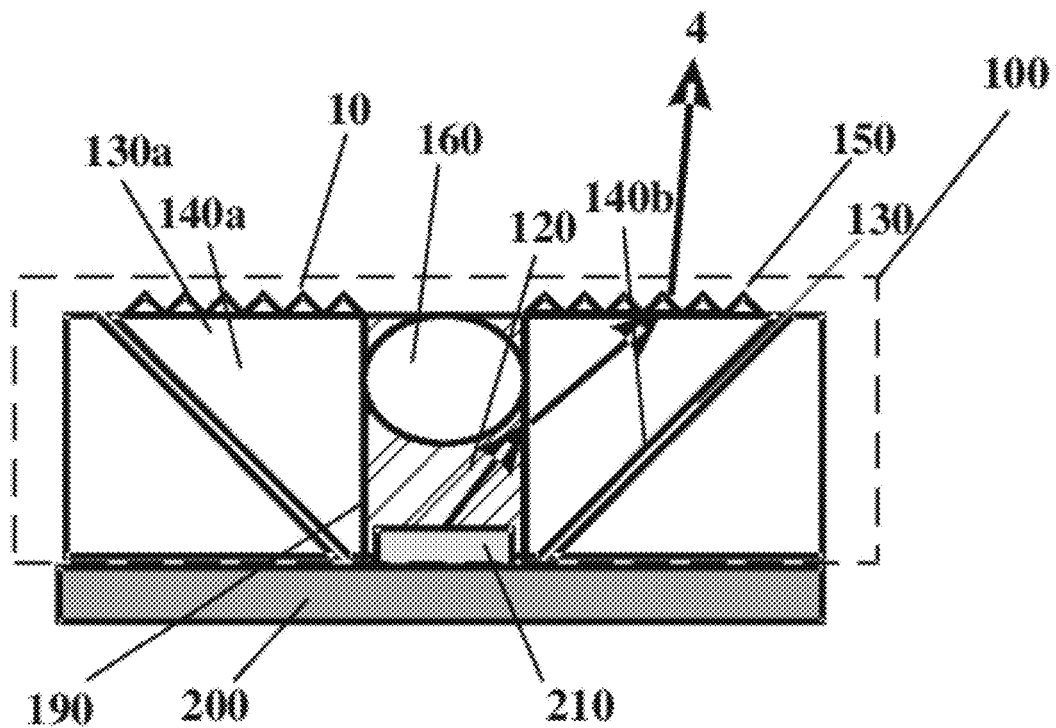
FIG. 4 is a cross-section view of a linear embodiment of an optical collimating assembly containing an optical collimating element fabricated with a subtractive laser cutting process. Included is a light redirecting layer with prism shaped features.

FIG. 3 and FIG. 4 are a cross-section views of linear embodiments of an optical collimating assembly containing an optical collimating element fabricated with a subtractive laser cutting process. Both embodiments include a refractive lens 160 in the shape of a sphere to increase collimation of light emitted through the shaped opening 110. Other refractive lens shapes that improve collimation or light distribution can be used in alternative embodiments. Half spheres, and prisms are examples of alternative embodiment shapes.

A secondary light-redirecting layer 150 can be used to further control light distribution. Examples of this include a diffuser or light redirecting features positioned at or near the output surface, as illustrated in FIG. 3 and FIG. 4. A secondary light redirecting layer may be an integral part of the optical element or it may detachably mounted to the collimating optical element or optically coupled to the collimating optical element so that the path of light is further directed. "Optically coupled" is defined herein as including the coupling, attaching or adhering two or more regions or layers such that the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between at least one of the regions or layers. Examples of optically coupling include lamination using an index-matched optical adhesive such as a pressure sensitive adhesive; lamination using a UV curable transparent adhesive; coating a region or layer onto another region or layer; extruding a region or layer onto another region or layer; or hot lamination using applied pressure to join two or more layers or regions that have substantially close refractive indices; or solvent bonding a region or layer to another region or layer. A "substantially close" refractive index difference is about 0.5, 0.4, 0.3 or less, e.g., 0.2 or 0.1. Optionally, the collimating optical element may contain light scattering regions formed during the manufacturing of the substrate material. Coextrusion or multi-shot injection molding are examples of processes that can be used to produce combinations of scattering and non-scattering regions. Alternatively, light redirecting features can be fabricated onto the output surface of the optical element by processes such as embossing.

Water jet cutting is an example of an alternative subtractive process to laser cutting suitable for fabrication of voids and recesses within the optical elements for some embodiments.

As an alternative embodiment the voids created to produce a light reflective surface in an optical element may be filled with a material of refractive index different from the starting substrate material and thus function similarly but without an air gap void. For example water, silver, gold, chromium, or copper could be used as a material to coat and/or fill void spaces. Silver and gold are of particular interest as they have a refractive index less than that of air and thus could produce a larger critical angle of total internal reflection and effectively allow for narrower reflector angles, more collimation, and fewer efficiency losses from light emitted at low angles which do not internally reflect. Chromium has a very high refractive index ~2.97 which could be used to create a large refractive index difference at the reflective interface. A thin layer with thorough coverage can be sufficient to produce a refractive index mismatch between the deposited material and the collimating optical element substrate material. Liquid solution, vapor deposition, or atomic layer deposition coating processes are example processes that can be used to produce a mirror type finish without permanently filling the entire air gap void space. Acrylic (PMMA) has a refractive index close to 1.49 and is a possible substrate material for the collimating optical element. Polycarbonate is another example lens substrate material and has a refractive index typically near 1.587.

One possible benefit of coating or filling the reflecting void space is that it can thus be made resistant to changes in reflection caused by the accumulation of water at the interface surface. This can be important in some applications that involve outdoor exposure or water condensing environments.

Figure 13:
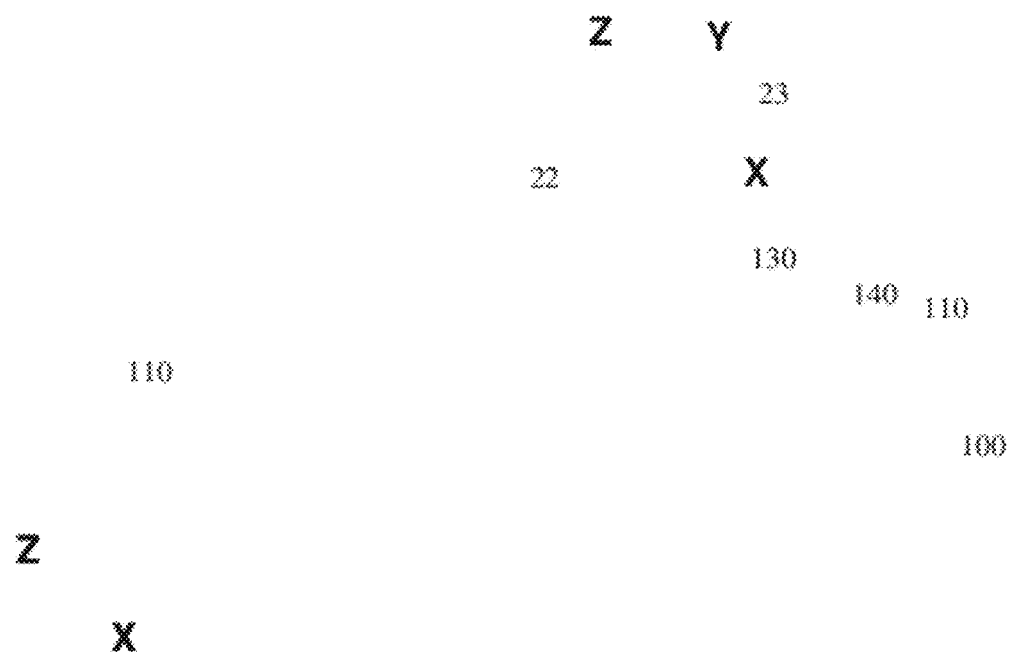
FIG. 13 shows a laser beam cutting angled air voids which serve as TIR reflecting walls in a linear collimating element.

FIG. 13 illustrates the process of cutting an optical element from a light transmissive substrate 40 by means of a high precision laser in accordance with an embodiment of the present invention. The laser beam is transmitted by means of a resonator, which amplifies and generates certain types of beam profiles. A focused beam output 22, for example, may be obtained by means of a laser with a focusing lens. The cutter uses a computer to direct the focused laser beam 22 at the material to be cut, for example, making embedded void space 130 cuts and complete cut outs through the light transmissive substrate 40 to produce shaped openings 110 as well as cut outs, slots, and the outer perimeter shapes for panels and tabs. In this process, if the light transmissive substrate 40 is moving along a carrier, e.g. a table, the laser piece moves in the X and Y direction of the workpiece and adjusts its height in the Z direction to make the lens cuts. Each type of cut has a particular depth and shape, and as such, each cut requires different operating parameters of the laser cutter to accomplish such depths and shapes. The output of the laser may be directed at the light transmissive substrate at a certain incident angle 23 to make angled cuts as shown in the cross section views of FIG. 2, FIG. 3, and FIG. 4. The angle of the focused laser beam output with respect to the normal is dependent on the angle of the cut to be made in the material for the lens. As the focused beam output cuts the light transmissive substrate, the material may melt, burn, or vaporize in accordance with an embodiment of the present invention, leaving an edge with a high-quality surface finish. $CO_2$ laser cutting of acrylic is well known as capable of producing a very flat and smooth surface which is usually preferred for an internally reflective optic. The rate at which the laser moves along the axis' is dependent on the cuts to be made. The relative movement between the workpiece on the carrier and the laser beam is preferably induced by an adjustment device, which is driven and adjusted by an adjustment control signal. The adjustment control signal is generated from the computer controlling the laser cutting process and is based upon the design of the lens. It is nevertheless also possible for the laser piece to remain fixated and move in the X and Z direction as the workpiece moves along the carrier. Furthermore, it is also possible for the laser to only move in the X or Y direction as the workpiece moves along the carrier. Alternatively the light transmissive substrate may remain stationary during fabrication and the laser may be moved in X, Y, or Z dimensions to direct the cutting pattern of the light transmissive substrate 40.

Once the workpiece has been cut, post-processing operations may be employed to the workpiece. Embodiments of the invention may thus include holes, tabs, clips, channels or other specific fastening or mounting structures. The integrated design of the optical element allows that the optic itself can contain such features without significantly interfering with the intended light distribution output from the optical element. Additional post-processing operations may also include cooling of the material, annealing, coating the lens with a diffusive material, or performing thermal treatment on the lens by heating and rapid cooling, induction heating, or laser heat treatment.

Figure 14:
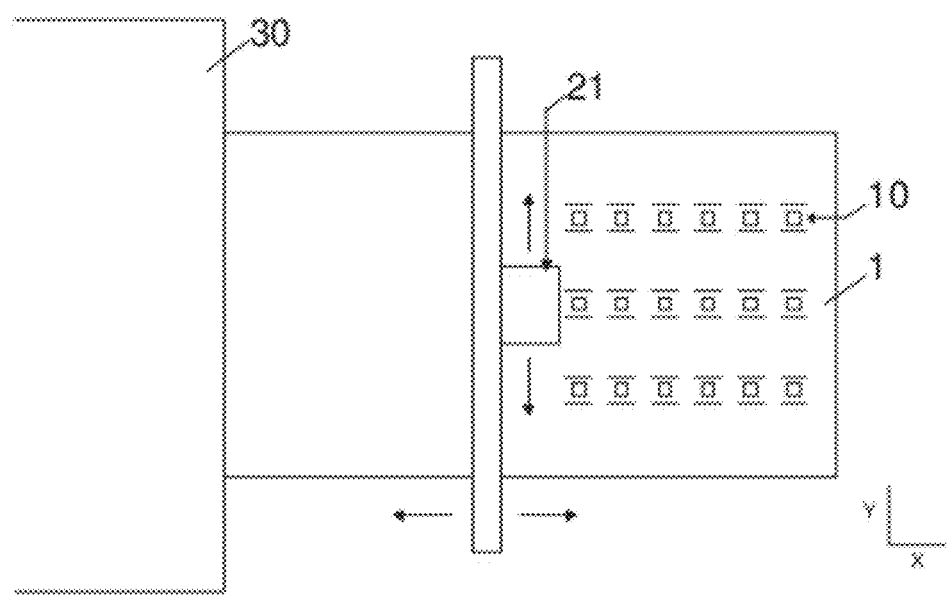
FIG. 14 is an overhead view of an example laser fabrication process configured for high volume production.

A step in the fabrication process of some embodiments is the cutting of the light transmissive sheet to a desired length. An advantage of some embodiments is that the lens may be cut from a sheet of light transmissive material to any reasonably contemplated length or configuration before or after localized subtractive processing of reflective walls and refractive walls. For embodiments fabricated with a continuous process such as shown in FIG. 14, cutting to piece size can be done in-line with a laser after refractive and reflecting walls have been fabricated.

One advantage of the present invention is its ability to easily scale in volume. In one embodiment, the system and method of the present invention integrates the mass production manufacturing techniques of sheet extrusion with an inline cutting with one or more lasers of multi-axis control to produce optical elements for applications such as collimating lenses for LED light fixtures. Such a system includes a sheet extrusion system for producing and processing light transmissive extrudable thermoplastic materials, a laser cutter for cutting embedded air voids, surface marks, holes, slots, panels, etc. into a selected substrate, a ventilation system to remove heat and combustible gasses from the cutting surface, and a computing system for controlling the cutting process. Functionality of a laser will increase proportionally with the number of axes of movement it has. For a basic embodiment a laser can be mounted in at a desired angle in a stationary manner and extruded sheet fed through to cut in the extrusion direction. Adding a x-y gantry system will allow the laser to travel with and across the extrusion flow direction. A 5 axes system will add tilt and rotation, useful for making embedded collimating air interfaces planar or conical in shape. In all cases, with a controller, the laser can be synchronized to the direction and speed of the extrusion in order to cut precision features laid out across the extruded sheet. Additionally, multiple lasers can be controlled in a synchronized manner to simultaneously cut different regions of moving sheet extrusion web.

The cutting of optical elements from the optical material is optimally performed at a temperature greater than the annealing temperature of the material being cut, where the material is stiff enough not to deform during process handling, but soft enough to avoid the accumulation of thermal stresses during high temperature laser processing and the following cooling. As typical with sheet extrusion lines, the extruded and laser cut material may pass through temperature control zones to provide slow even cooling and the avoidance of warping during cool down.

Some of the benefits realized from the invention include high output efficiency, low production startup costs, low setup time, reduced chance of warping of the material that is being cut, highly precise lenses that are cost effective when either produced in low or high quantities, and reduced product waste. The fully integrated lens production system provides for uniformity in system components and performance.

The system can be used to cut, engrave, and embed air voids within materials in a wide variety of applications and industries. One or more lasers can be configured as needed to match the cutting throughput with extrusion line speed. Multiple lasers can cut in parallel with each other or be positioned along the extrusion path to cut sequentially. The system and method also allows for an extremely dense arrangement of lenses in a sheet. Since the unused space can be reduced significantly, the method produces an optically efficient area of nearly 100 percent.

The system and method of the present invention, for example, may be used for producing strips and arrays of collimating optical elements. The lenses with embedded air voids enable compact designs of light modules with multiple LEDs that can be combined into single integrated optical elements as well as optical systems. For long or large optical assemblies the invention provides a means of manufacturing without the often prohibitively expensive tooling and equipment costs associated with large injection molded optics. The accuracy of the method of the present invention makes it suitable for not only the production of lenses in lighting applications, but also optical elements utilizing TIR optics in general.

With the improved manufacturing process, a cost-efficient way to produce a wide range of optical elements and designs has been developed by the system and method of the present invention.

FIG. 14 is an overhead view of an embodiment process configured for high volume production whereby after exiting the extruder 30 the workpiece 1 is heated to the annealing temperature, or annealing point, of lens material if it is not already at that temperature or above. Upon exiting the extruder 30, the workpiece 1 is at a certain temperature T1. The surface of the workpiece, in accordance with an embodiment of the present invention, must be heated above the annealing temperature of the material for the workpiece to facilitate enabling the surface to be cut without introducing surface stresses or altering the microstructure undesirably. Typically annealing temperature ranges for acrylic, for example, are between 85 and 160 degrees Celsius. While the surface of the workpiece is at or above the annealing temperature, the surface may be cut 10 by a high precision laser with a laser piece 21 in accordance with the present invention, as shown in FIG. 13.

Figure 15:
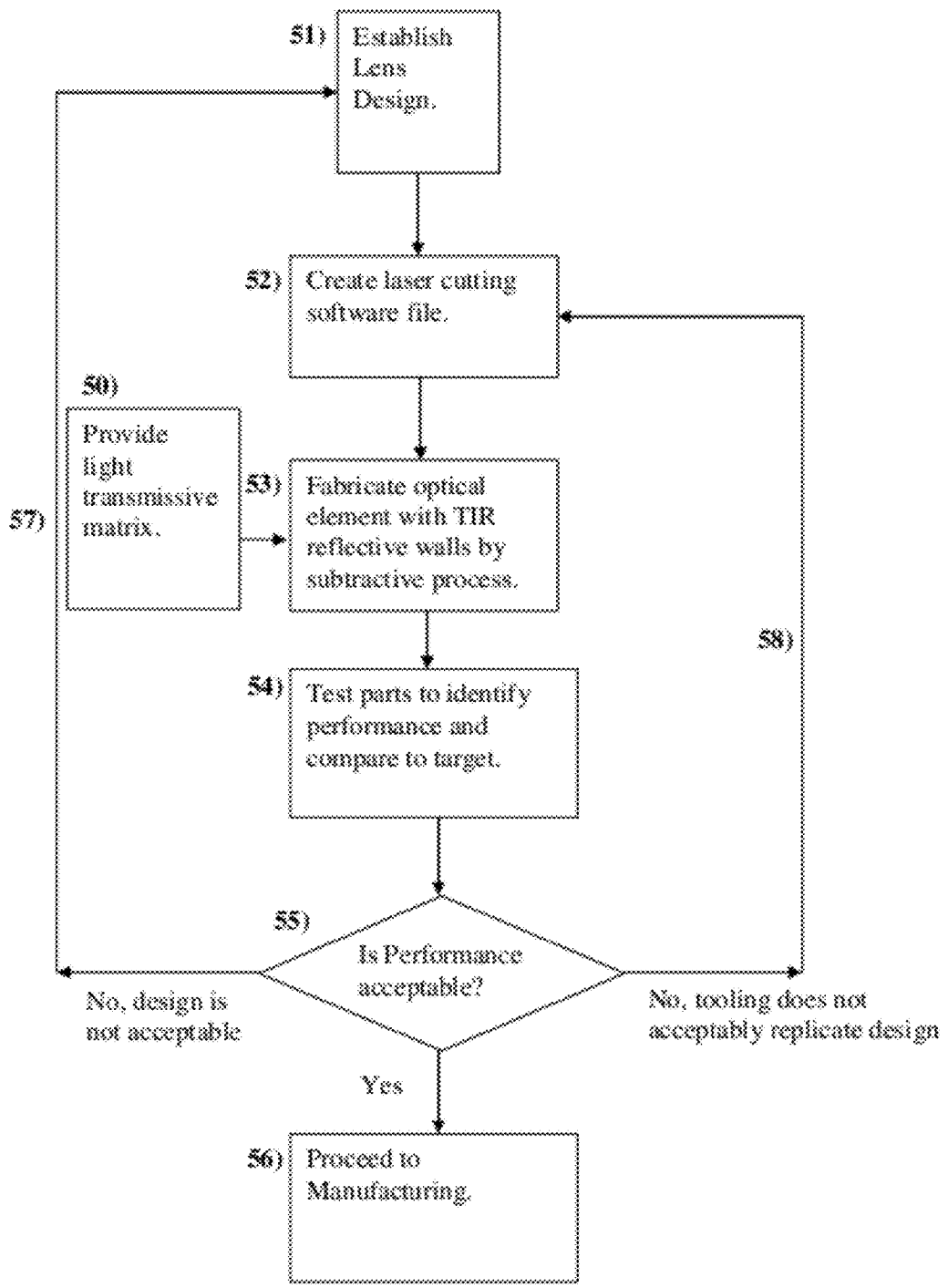
FIG. 15 is a flowchart showing the development cycle associated with the development of optical elements to be manufactured by a subtractive voiding process which produces TIR features.
Figure 16:
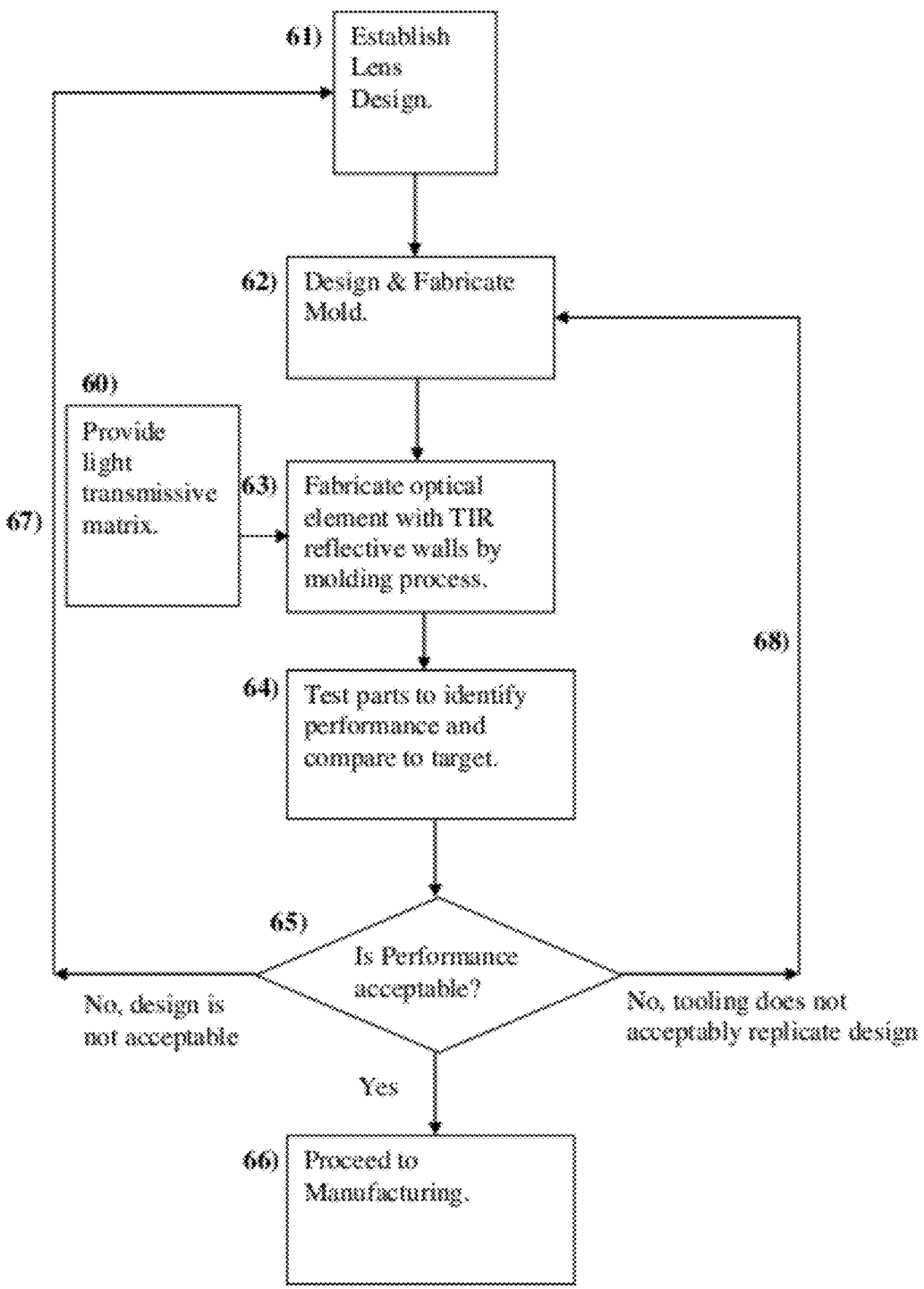
FIG. 16 is a flowchart showing the development cycle associated with the development of optical elements to be manufactured by an injection molding process as is typical of current commercial LED lenses.

FIG. 15 is an exemplary flow chart illustrating an embodiment method in developing and manufacturing collimating optical elements and assemblies. The system is constructed in a modular fashion, and can therefore be adopted and adapted in part depending on the application and desired optical inputs and output from an optical assembly. Step 51) establishes a lens design suitable for fabrication by the embodiment fabrication method. Example designs are provided in this filing and many more can be produced using principles of total internal reflection and optical engineering. Snell's law is a fundamental physical law dictating design of TIR optics. The embodiment method provides the ability to easily integrate a specific given spatial distribution of multiple light sources into a single optical element. This provides significant convenience in the reuse of existing light source layouts to achieve new light distribution outputs. Additionally overall performance advantages can be achieved by allowing other factors such as thermal management to be optimized by spatial layout with light sources subsequently integrated mechanically and in optical mixing and output by designs of the embodiment method.

Another step of the embodiment method flow charted in FIG. 15 is step 50) to provide light transmissive matrix which serves as a substrate for fabrication of an optical element. Acrylic and polycarbonate are examples of common optically clear materials that may be utilized for the production of optical elements. Depending on the application, one type of material and manufacturing process may be more appropriate than another. Although the system is found to be particularly advantageous in mass production environments, all common molding processes may be used in the first step of the process, including injection molding, compression molding, and extrusion. Extrusion, for example, is a continuous production method of manufacturing acrylic sheet that would be well suited for the system and methods of the present invention, but it is no so limited. In the process, pellets of resins are fed into an extruder which heats them until they are a molten mass. This mass is then forced through a die as a molten sheet. Subsequently, the molten sheet is fed to calendar rolls, the spacing of which determine the thickness of the sheet and in some cases the surface finish.

Another step of the embodiment method flow charted in FIG. 15 is step 52) to create fabrication instructions for step 53) in the form of software to control a localized subtractive process such as laser cutting. Embodiments of this process step 52) have been realized in practice by the use of a graphic software program combined with a commercially available Legend CO2 laser system with print driver from Epilog Laser Corporation of Golden, Colo. Other applicable software solutions can be generated, for example by commercially available or custom CAD or graphic arts software applications linked with laser print drivers or CNC controllers. A CNC controller integrated with a 5-axis CO2 laser is particularly well suited for rapidly delivering and executing laser cutting instructions where cuts at multiple angles of incidence to a light transmissive substrate are required.

Another step of the embodiment method flow charted in FIG. 15 is 53) to fabricate an optical element with internally reflective walls by a localized subtractive process. Step 53) uses instructions from step 52) to control a localized subtractive process such as laser cutting to fabricate air voids within the light transmissive matrix which concurrently provide reflecting walls for total internal reflection within the fabricated optical element. In a preferred embodiment, the cutting of the light transmissive matrix material with a high precision laser occurs while the material is at an annealing temperature which limits the development of residual stresses in the optical element. This is an advantage of the embodiment which can optionally be included in step 53). The type of laser utilized in the present invention depends on the material being cut. Said laser may for example be a CO2 or Fiber laser. Part of step 53) may also optionally include further post-processing operations employed to the workpiece, for example to remove undesired surface characteristics or to produce hybrid optical components. Cutting or trimming of the light transmissive sheet to a desired part size can also be performed by a subtractive of step 53). The lens may be cut of any length, large or small, an advantage of the system. Cutting or trimming of a continuous web of light transmissive sheet may be combined with the cutting of embedded reflecting walls within step 53).

Figure 17:
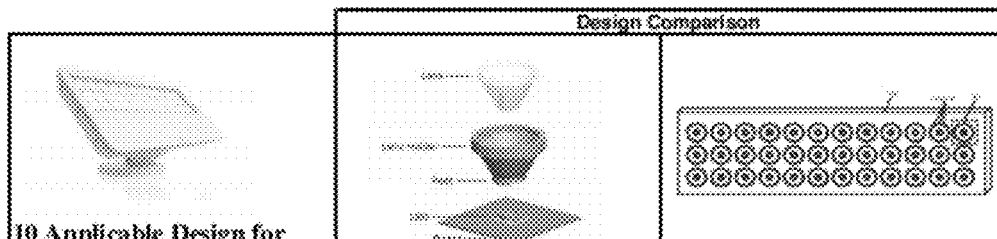
FIG. 17 is a table summarizing Design For Manufacturing analysis results comparing an circular embodiment optical assembly, FL1 vs. a conventional optical assembly.

Steps 54) and 55) in the embodiment method flow charted in FIG. 15 test the performance of fabricated optical components and redirect the process flow to reiterate portions of the overall process which need improvement. Without the need for tooling to fabricate specific reflecting wall designs, the process can be reiterated relatively quickly thereby providing a rapid prototyping method. The overall benefits of the embodiment method flow charted in FIG. 15 has been analyzed in comparison to the an injection molding development and manufacturing method typical of those used to develop and manufacture commercial collimating optical elements and assemblies and the results are summarized in the table of FIG. 17.

It will be understood that although the foregoing description details designs, development methods, and manufacturing methods for specific collimating optical assembly and optical element embodiments for purposes of illustrating embodiments which may be used to advantage, it is to be recognized that the invention is not limited thereto. Therefore, any and all variations and modifications that may occur to those skilled in the applicable art are to be considered as being within the scope and spirit of the invention.

What is claimed is:

1. A method for producing a collimating optical element comprising:
    a) providing an optical element design which includes
        i. one or more embedded internally reflective surfaces extending to at least one external surface;
        ii. at least one shaped opening into which an emitting area of a light source can be positioned;
    b) creating a cutting pattern or program to serve as instructions for a localized subtractive process;
    c) Using said localized subtractive process to remove material from a light transmissive volume in a manner which creates air voids within said volume whereby said air voids provide internal reflecting walls within said light transmissive volume.

2. A method for producing an optical element as claimed in claim 1 wherein said localized subtractive process traces said cutting pattern onto the surface of said light transmissive volume; further controlling the incident angle of subtraction to the surface of said light transmissive volume thereby controlling the intersecting angle of the resulting reflecting wall with the surface of said light transmissive surface.

3. The method of claim 1 wherein said localized subtractive process uses a laser.

4. The method of claim 3 wherein said laser is a $CO_2$ laser.

5. The method of claim 1 wherein said localized subtractive process is water jet cutting.

6. The method of claim 1 wherein said light transmissive volume is a sheet.

7. The method of claim 1 wherein said light transmissive volume is acrylic.

8. The method of claim 1 wherein a fastening feature is additionally fabricated with a localized subtractive process.

9. The method of claim 8 for producing an optical element wherein a fastening features is located in an optically isolated region.

10. The method of claim 8 for producing an optical element wherein the fastening feature is a hole, tab, clip, or channel.

11. A method for producing an optical element as claimed in any preceding claims, wherein said localized subtractive process is performed with the light transmissive volume at or above an annealing temperature.

12. A method for producing an optical element as claimed in any preceding claims wherein said transmissive light volume is annealed after said localized subtractive process is performed.

13. The method of claim 1 whereby said localized subtractive process is performed on a moving light transmissive volume.

14. A method for producing an optical element as claimed in claim 13 whereby said moving light transmissive volume is engaged in a polymer extrusion process or its subsequent following processing steps.

15. The method of claim 1 wherein said reflecting wall is subsequently coated with a material of refractive index different than the material of the light transmissive volume.

16. An optical element suitable for manufacture by the method of claim 1, wherein every surface location of each reflective wall either intersects or is tangent with a line that can be extended from outside the optical element without passing through the light transmissive volume.

17. A method for producing a total internal reflecting collimating optical element as claimed in claim 1 in which a product is developed by iterations of design, testing, and fabrication.

18. A method for producing an optical element as claimed in claim 1, whereby no molds are used to fabricate reflecting walls.

* * * * *